(12) United States Patent
Lee

(10) Patent No.: US 11,045,990 B1
(45) Date of Patent: Jun. 29, 2021

(54) 3D PEN

(71) Applicant: Chang Hwan Lee, Incheon (KR)

(72) Inventor: Chang Hwan Lee, Incheon (KR)

( * ) Notice: Subject to any disclaimer, the term of this patent is extended or adjusted under 35 U.S.C. 154(b) by 0 days.

(21) Appl. No.: 17/123,563

(22) Filed: Dec. 16, 2020

(30) Foreign Application Priority Data

Feb. 3, 2020 (KR) ........................ 10-2020-0012365

(51) Int. Cl.
*B29C 48/17* (2019.01)
*B29C 48/02* (2019.01)
*B29C 48/92* (2019.01)
*B29C 64/118* (2017.01)
*B29C 64/205* (2017.01)

(52) U.S. Cl.
CPC ............ B29C 48/175 (2019.02); B29C 48/02 (2019.02); B29C 48/92 (2019.02); B29C 64/118 (2017.08); B29C 64/205 (2017.08); *B29C 2948/92019* (2019.02); *B29C 2948/92542* (2019.02); *B29C 2948/92704* (2019.02); *B29K 2995/0021* (2013.01)

(58) Field of Classification Search
CPC ....... B29C 48/175; B29C 48/92; B29C 48/02; B29C 64/118
See application file for complete search history.

(56) References Cited

U.S. PATENT DOCUMENTS 7,604,470 B2 * 10/2009 LaBossiere ......... B29C 48/2556
425/131.1
9,701,065 B2   7/2017 Hang et al.
2014/0154347 A1 * 6/2014 Dilworth ............. B29C 48/2528
425/87
2015/0037446 A1 * 2/2015 Douglass ............ B29C 67/0055
425/131.1
2017/0144369 A1 * 5/2017 Suvorov ................ B29C 64/106
2019/0111725 A1 * 4/2019 Xie .......................... B43K 8/22

FOREIGN PATENT DOCUMENTS

| CN | 204914576 U | 12/2015 |
| CN | 206465459 U | 9/2017 |
| CN | 206465465 U | 9/2017 |
| EP | 2 957 420 A1 | 12/2015 |
| KR | 10-1694872 B1 | 1/2017 |
| KR | 10-1749597 B1 | 6/2017 |
| WO | 2016/030761 A2 | 3/2016 |

OTHER PUBLICATIONS

Notification of Reason for Refusal of KR 10-2020-0012365 dated Mar. 17, 2020.
Grant of Patent of KR 10-2020-0012365 dated Apr. 1, 2020.

* cited by examiner

*Primary Examiner* — Galen H Hauth
(74) *Attorney, Agent, or Firm* — Sughrue Mion, PLLC

(57) ABSTRACT

The present invention relates to a three-dimensional (3D) pen with a novel structure which enables filaments having various colors to be easily selected and used. According to the 3D pen according to the present invention, a user laterally rotates the adjustment lever (25) to allow the driving motor (24) to be connected to different transfer rollers (22), thereby selectively transferring and discharging a plurality of different filaments (1) forward. Therefore, the 3D pen has a very simple structure and has an advantage in that the filaments (1) having various colors can be easily selected to manufacture objects having various colors.

4 Claims, 15 Drawing Sheets

[Fig. 1]
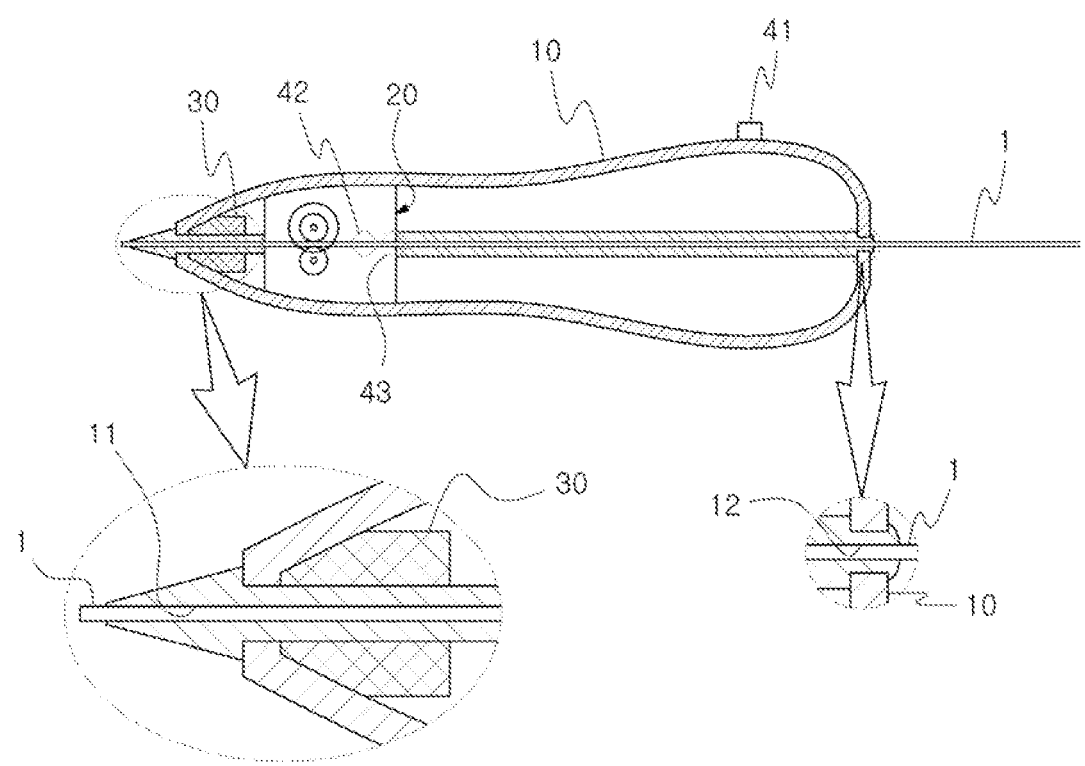

[Fig. 2]
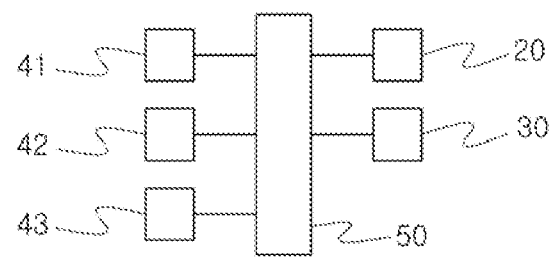

[Fig. 3]
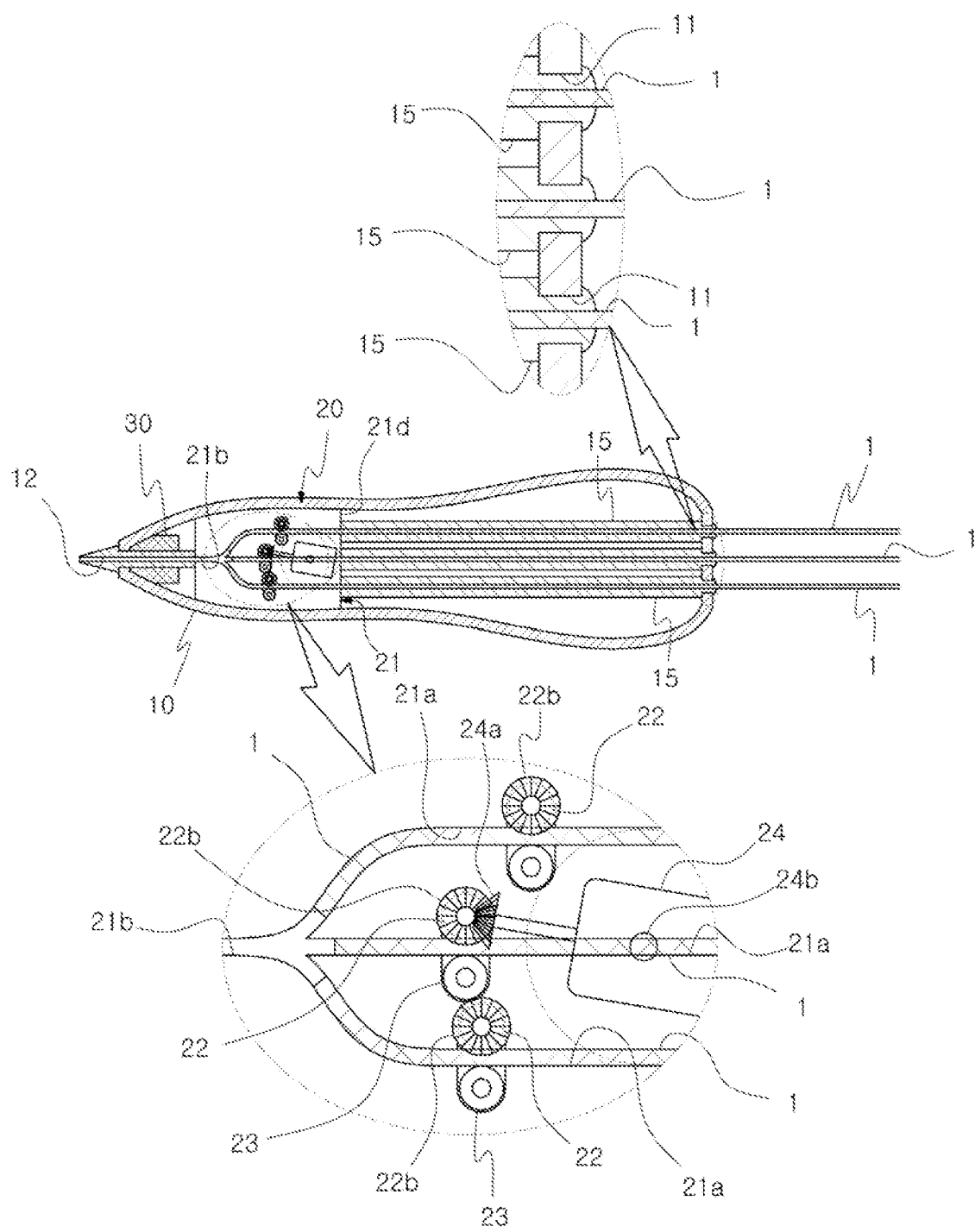

[Fig. 4]
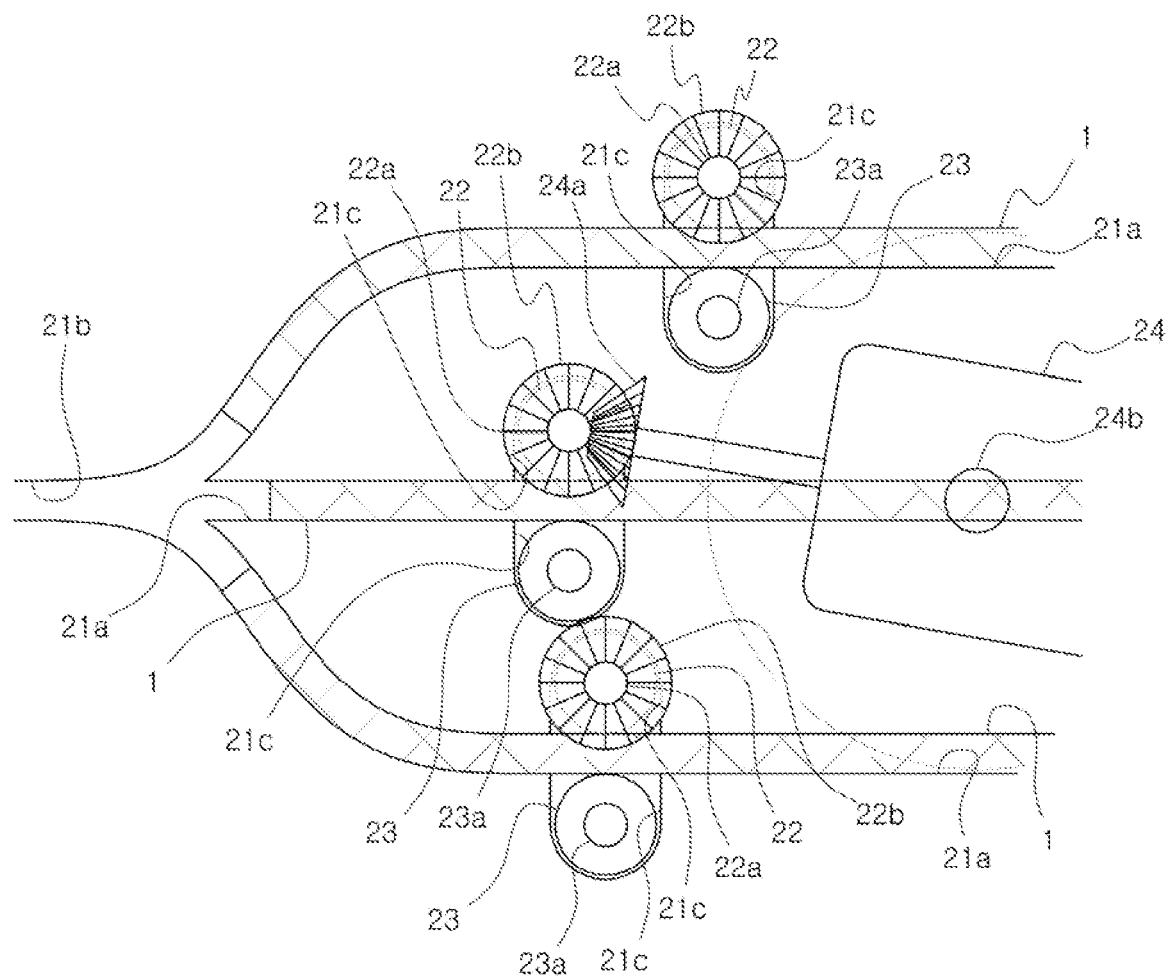

[Fig. 5]
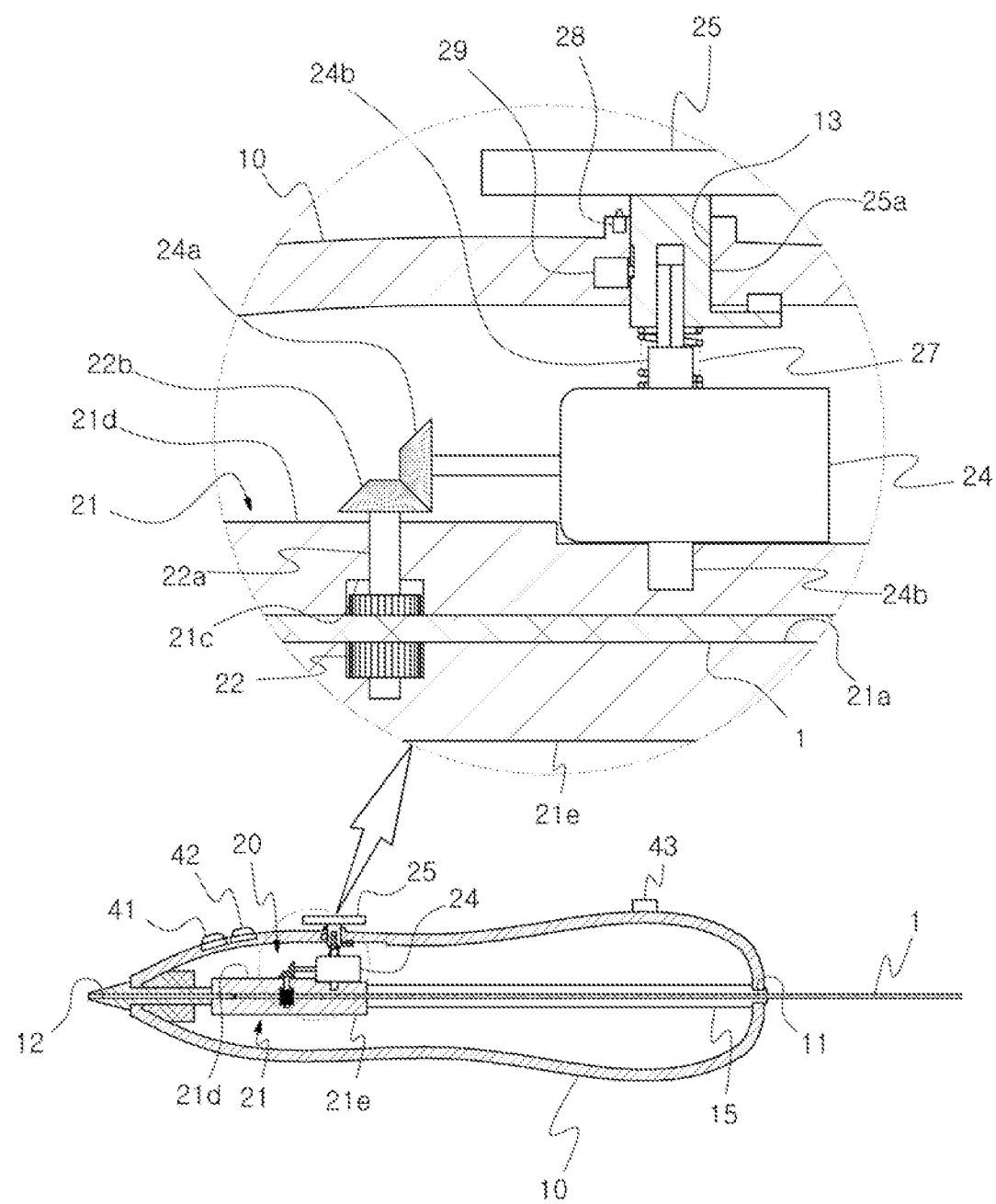

[Fig. 6]
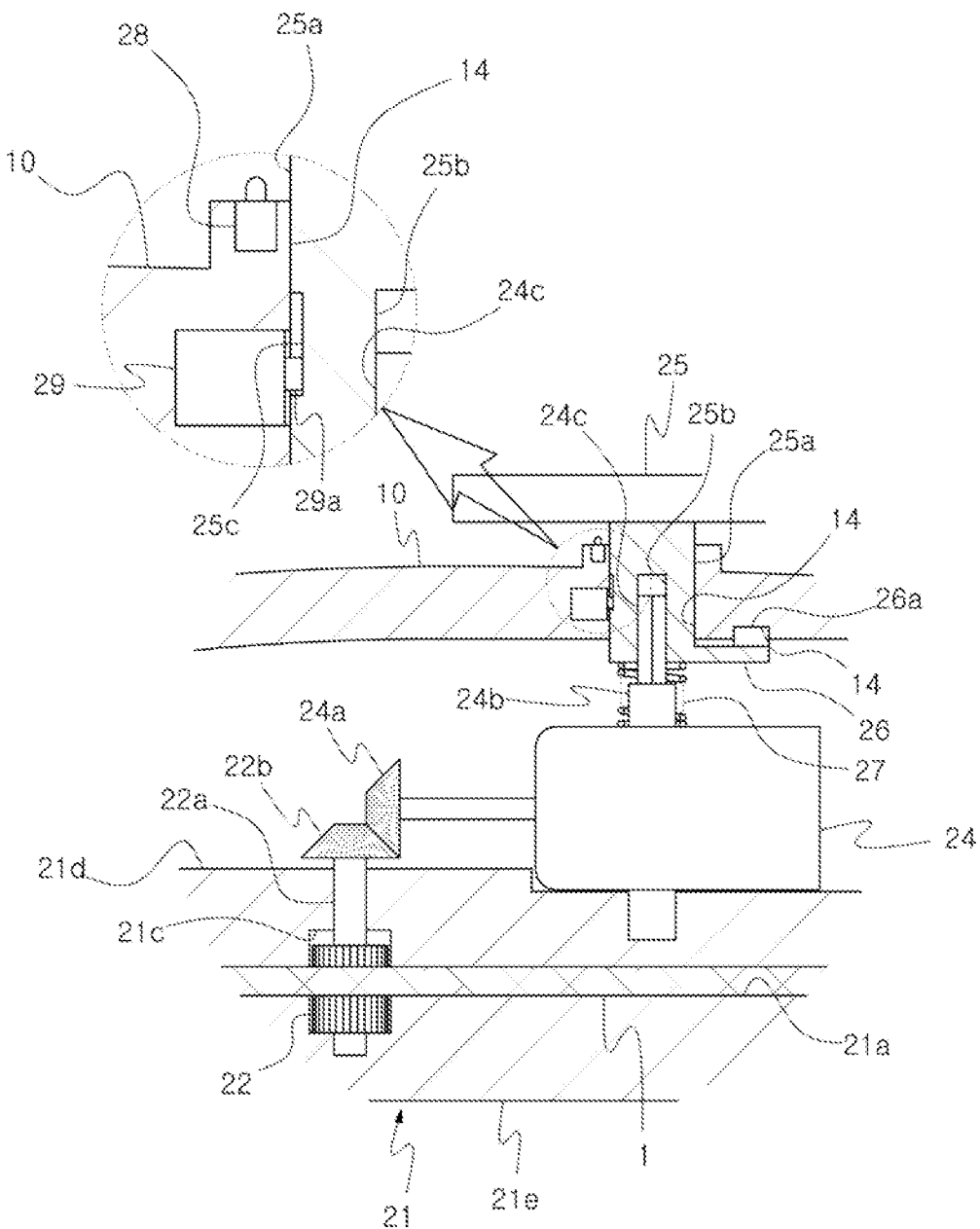

[Fig. 7]
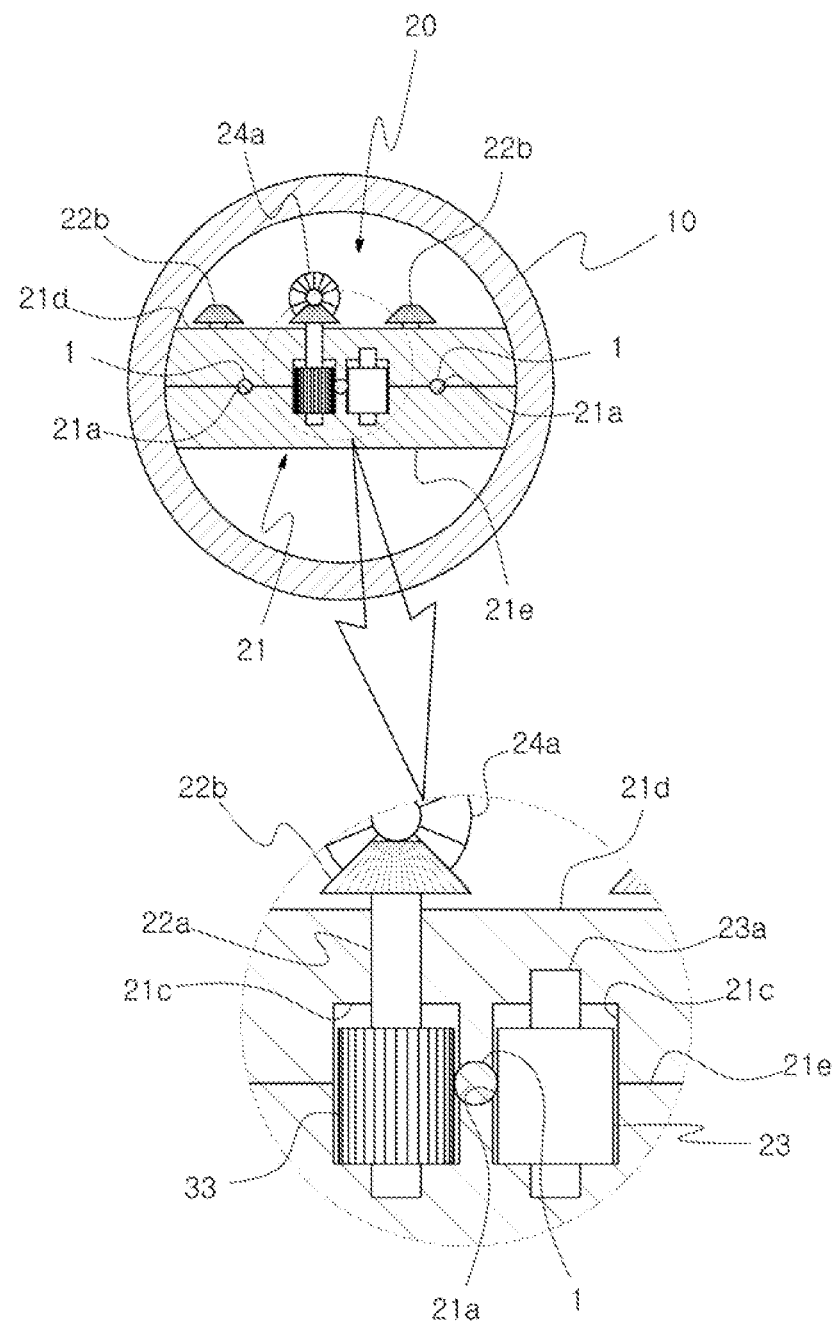

[Fig. 8]
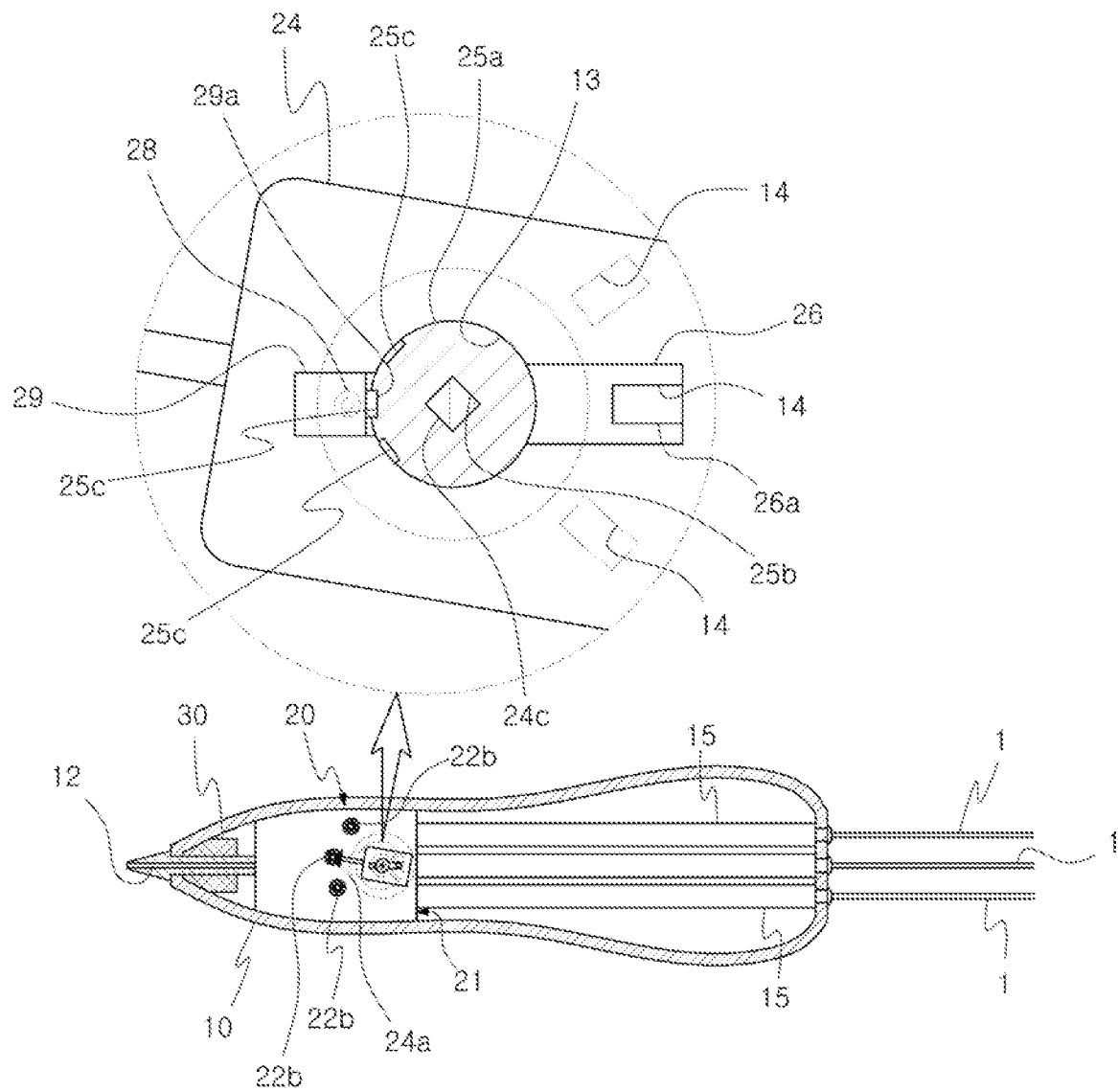

[Fig. 9]
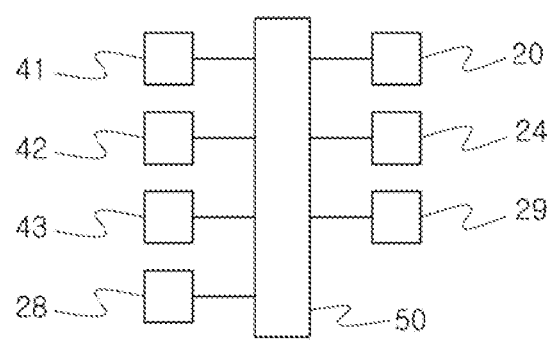

[Fig. 10]
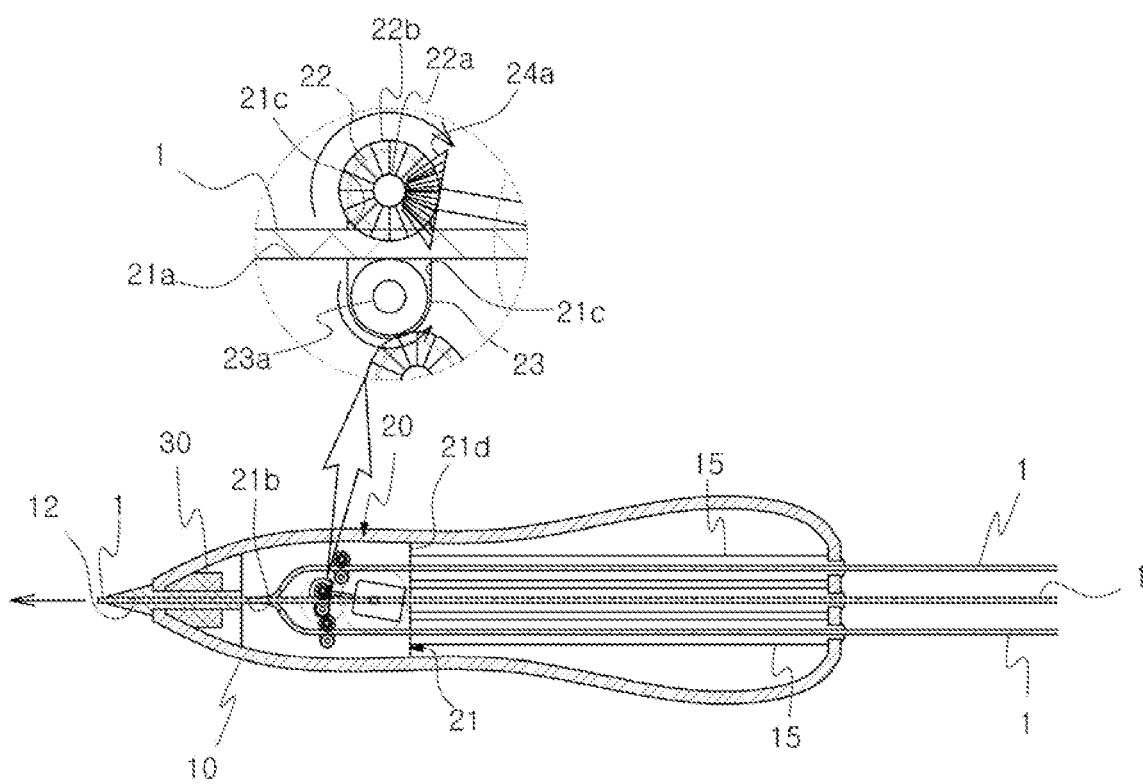

[Fig. 11]
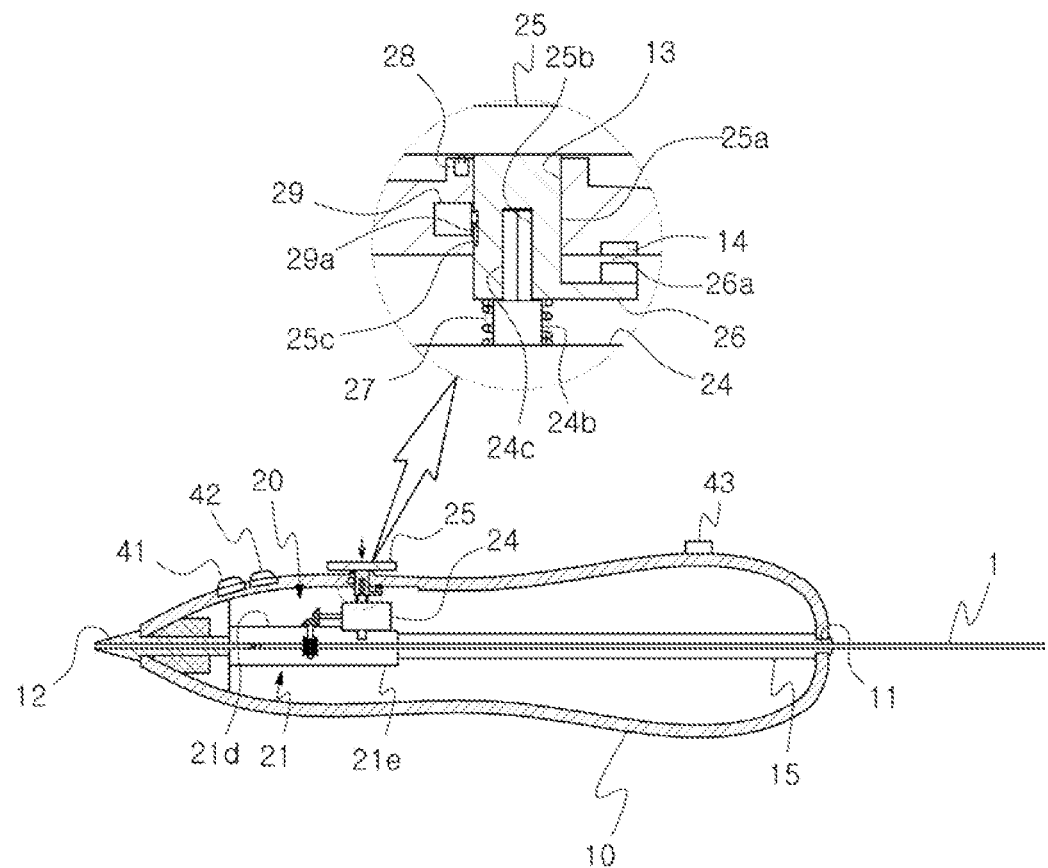

[Fig. 12]
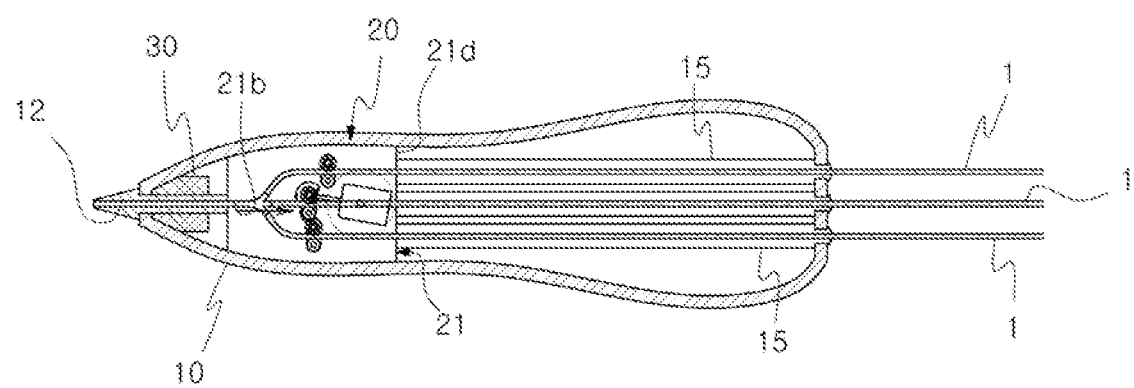

[Fig. 13]
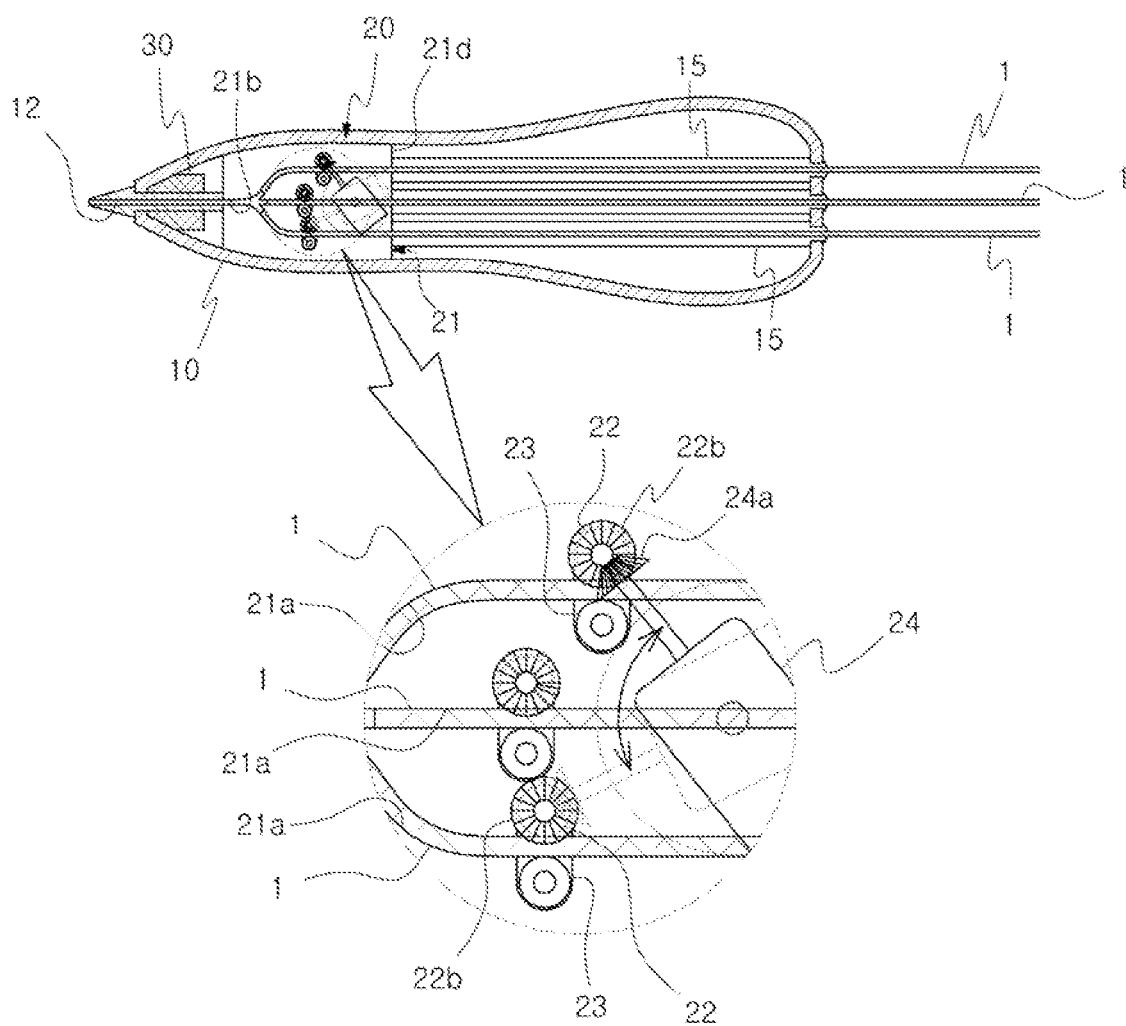

[Fig. 14]
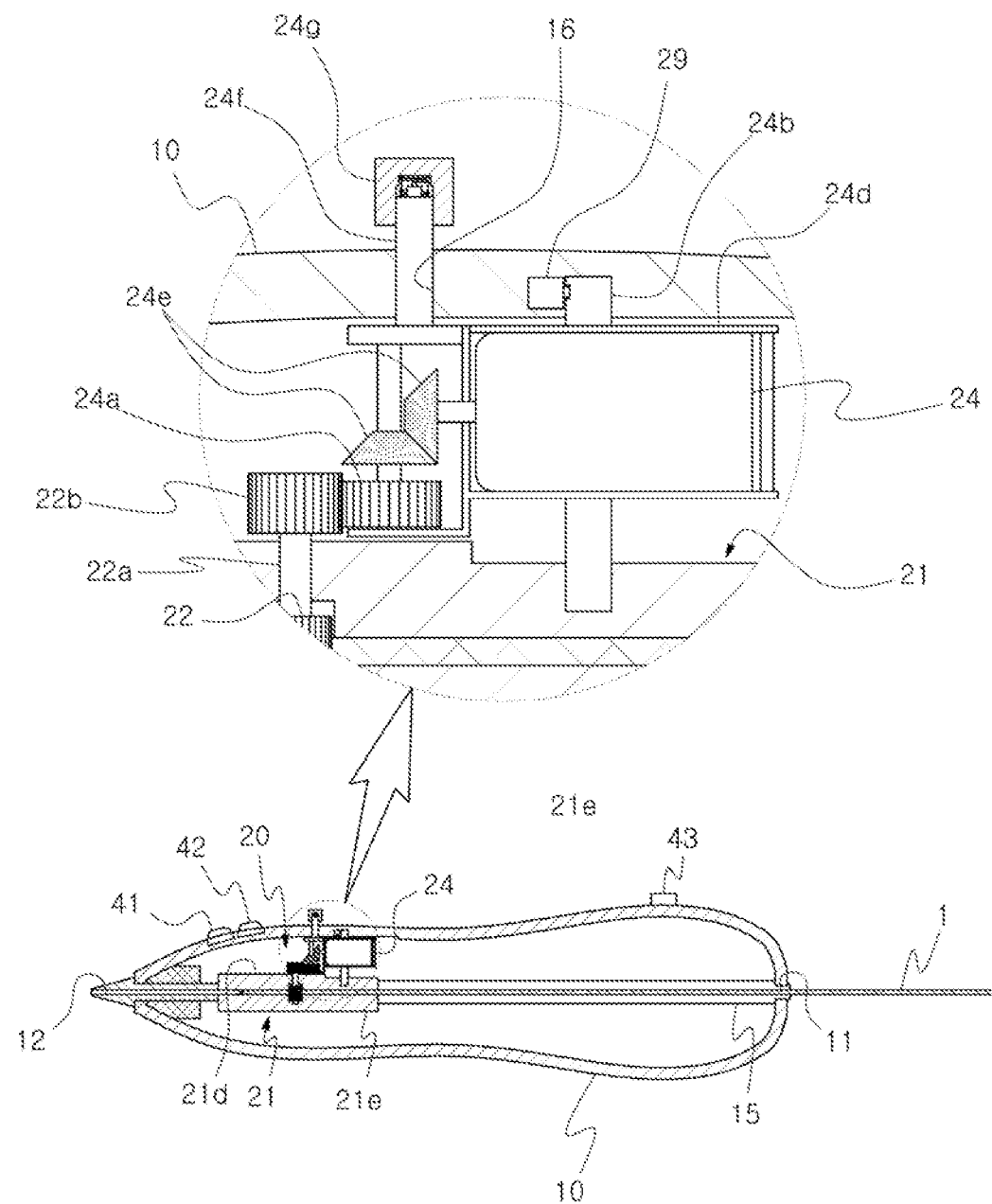

[Fig. 15]
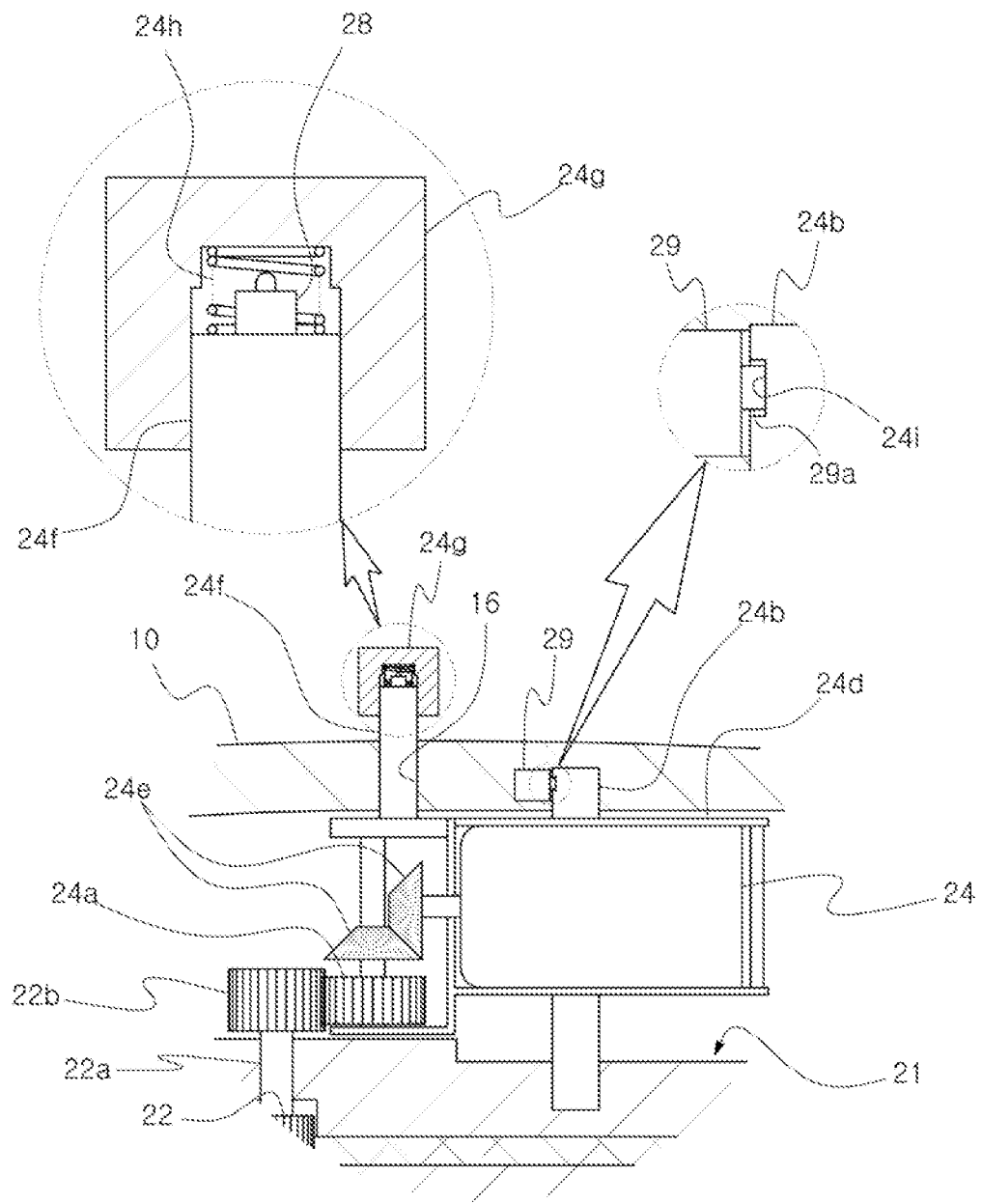

3D PEN

CROSS REFERENCE TO RELATED APPLICATIONS

This application is claiming priority based on Korean Patent Application No. 10-2020-0012365 filed on Feb. 3, 2020, the entire disclosure of which is incorporated herein by reference.

BACKGROUND

1. Field of the Invention

The present invention relates to a three-dimensional (3D) pen with a novel structure which enables filaments having various colors to be easily selected and used.

2. Discussion of Related Art

Recently, three-dimensional (3D) pens, which enable a user to freely manufacture 3D objects, have been developed and widely used.

Such a 3D pen is configured to heat and discharge a filament that is formed in a long rod shape and made of a thermosetting synthetic resin material. As shown in FIGS. 1 and 2, the 3D pen includes a housing 10 extending in a front-rear direction and having a supply hole 11 and a discharge hole 12, through which a filament 1 passes, formed in front and rear sides thereof, a supply unit 20 provided inside the housing 10 and configured to supply the filament 1 supplied to the supply hole 11 toward the discharge hole 12, and a heating unit 30 configured to heat the filament 1 to be discharged through the discharge hole 12.

In this case, input parts 41, 42, and 43, which are operated by a user to control operations of the heating unit 30 and the supply unit 20, are provided on an outer surface of the housing 10.

The input parts 41, 42, and 43 are provided as switches which are pressed by a hand of the user to input a signal. The input parts 41, 42, and 43 include a power switch 41 for turning the heating unit 30 on, a forward switch 42 for making the filament 1 protrude in front of the discharge hole 12, and a rearward switch 43 for retracting the filament 1.

Therefore, in a state in which the user supplies the filament 1 to the supply unit 20 through the supply hole 11, when the user operates the input parts 41, 42, and 43 to turn the heating unit 30 on and operates the input parts 41, 42, and 43 to drive the supply unit 20, the filament 1 is supplied toward the discharge hole 12 through the supply unit 20, heated by the heating unit 30, and then discharged to the outside of the housing 10 through the discharge hole 12. Thus, when the user adjusts the position of a leading end of the 3D pen, the filament 1 discharged through the discharge hole 12 is cooled and hardened to manufacture an object in a shape desired by the user.

Meanwhile, a color of the object manufactured using the 3D pen is determined according to a color of the filament 1.

Therefore, in order to manufacture an object having various colors, since the user is required to replace the filament 1 according to a color of the object to be manufactured, the use of the 3D pen has been very troublesome to the user.

Therefore, there is a need for a novel method to solve such a problem.

RELATED ART DOCUMENTS

Patent Documents

Registered Patent No. 10-1749597

SUMMARY OF THE INVENTION

The present invention is directed to providing a three-dimensional (3D) pen with a novel structure which enables filaments (1) having various colors to be easily selected and used.

According to an aspect of the present invention, there is provided an a 3D pen including a housing (10) extending in a front-rear direction and having supply holes (11) and a discharge hole (12), through which filament (1) pass, formed in front and rear sides thereof, a supply unit (20) provided inside the housing (10) and configured to supply the filaments (1) supplied to the supply holes (11) toward the discharge hole (12), a heating unit (30) configured to heat the filaments (1) to be discharged through the discharge hole (12), input parts (41, 42, 43) provided on the housing (10), and a controller (50) configured to control operations of the heating unit (30) and the supply unit (20) by receiving signals from the input parts (41, 42, 43), wherein the supply unit (20) includes a guide block (21) which is provided to extend in the front-rear direction and has a plurality of supply passages (21a), through which the filaments (1) pass, formed therein, a plurality of transfer rollers (22) which are provided in the guide block (21) so as to be positioned at middle portions of the supply passages (21a), come into close contact with the filaments (1) passing through the supply passages (21a), and are rotated to transfer the supplied filaments (1) forward and rearward, and a driving motor (24) which is provided at the guide block (21) and is selectively connected to the transfer roller (22) to drive the transfer roller (22).

The guide block (21) may have a connection passage (21b) formed therein to be positioned in front of the supply passage (21a), and a front end portion of the supply passage (21a) may be connected to a rear end portion of the connection passage (21b) so that the filament (1) supplied through each supply passage (21a) passes through the connection passage (21b).

The transfer roller (22) may be rotatably coupled to the guide block (21) through a rotation shaft (22a) vertically extending, driven gears (22b) may be connected to the transfer rollers (22), the driving motor (24) may be coupled to the guide block (21) through a rotation shaft (24b) vertically extending so as to be laterally rotatable, and a drive gear (24a) selectively coupled to the driven gear (22b) may be coupled to a driving shaft of the driving motor (24) so that, when the driving motor (24) is laterally rotated, the drive gear (24a) is selectively coupled to one of the driven gears (22b).

A through-hole (13) concentric with the rotation shaft (24b) may be formed in the housing (10), and the 3D pen may further include an adjustment lever (25) provided outside the housing (10) and coupled to the rotation shaft (24b) through the through-hole (13) so as to be slidable in a length direction of the rotation shaft (24b) and to not be laterally rotated, a rotation member (26) connected to a portion of the adjustment lever (25) provided inside the housing (10), an elastic member (27) connected to the adjustment lever (25) or the rotation member (26) to press the adjustment lever (25) so as to protrude outward from the housing (10), a pressure sensing part (28) provided in the housing (10) to detect the adjustment lever (25) when the adjustment lever (25) slides toward the housing (10), and a fixing part (29) coupled to the rotation member (26) and configured to fix the rotation member (26) and the adjustment lever (25) so as to not be rotated, wherein a plurality of concave grooves (14) are formed in an inner surface of the housing (10) around the through-hole (13), a protrusion (26*a*) is formed on the rotation member (26) and selectively inserted into the concave groove (14), and fixing grooves (25*c*) to which the fixing part (29) is selectively coupled are formed in a circumferential surface of the rotation member (26) so that, when a user presses the adjustment lever (25) to slide the adjustment lever (25) and the rotation member (26) into the housing (10), the controller (50) reversely drives the driving motor (24) to retract the filament (1) by a predetermined distance and then controls the fixing part (29) to release the fixing of the rotation member (26) and to allow the user to rotate the adjustment lever (25).

A rotation body (24*d*) may be coupled to the outside of the driving motor (24), the rotation shaft (24*b*) may be provided in the rotation body (24*d*), a lever (24f), which extends upward through a guide hole (16) formed in an upper surface of the housing (10), may be provided at the rotation body (24*d*), a push button (24*g*), which is pressed upward by an elastic member (24*h*), may be provided at an upper end portion of the lever (24f), and the 3D pen may further include a pressure sensing part (28) provided on the upper end portion of the lever (24f) to detect the push button (24*g*) when a user presses the push button (24*g*) downward, and a fixing part (29) coupled to the rotation shaft (24*b*) to fix the rotation shaft (24*b*) and the drive motor (24) so as to not be rotated, wherein, when the user presses the push button (24*g*) downward, the controller (50) receives a signal from the pressure sensing part (28) to detect the signal, reversely drives the driving motor (24) to retract the filament (1) by a predetermined distance, and then controls the fixing part (29) to release the fixing of the rotation shaft (24*b*) and the drive motor (24) and to allow the user to laterally push the lever (24F) and to laterally rotate the driving motor (24).

BRIEF DESCRIPTION OF THE DRAWINGS

FIG. 1 is a cross-sectional plan view illustrating a conventional three-dimensional (3D) pen.

FIG. 2 is a circuit diagram of the conventional 3D pen.

FIG. 3 is a cross-sectional plan view illustrating a 3D pen according to the present invention.

FIG. 4 is an enlarged cross-sectional plan view illustrating main parts of the 3D pen according to the present invention.

FIG. 5 is a cross-sectional side view illustrating the 3D pen according to the present invention.

FIG. 6 is an enlarged cross-sectional side view illustrating the main parts of the 3D pen according to the present invention.

FIG. 7 is a cross-sectional front view illustrating the 3D pen according to the present invention.

FIG. 8 is a cross-sectional plan view illustrating shapes of a rotation member and a concave groove of the 3D pen according to the present invention.

FIG. 9 is a circuit diagram of the 3D pen according to the present invention.

FIGS. 10 to 13 are reference views illustrating the operation of the 3D pen according to the present invention.

FIG. 14 is a cross-sectional side view illustrating a 3D pen according to a second embodiment of the present invention.

FIG. 15 is an enlarged cross-sectional side view illustrating main parts of the 3D pen according to the second embodiment of the present invention.

DETAILED DESCRIPTION OF EXEMPLARY EMBODIMENTS

Hereinafter, the present invention will be described in detail with reference to the accompanying exemplary drawings.

FIGS. 3 to 13 illustrate a three-dimensional (3D) pen according to the present invention. The 3D pen according to the present invention is similar to a conventional 3D pen in that the 3D pen includes a housing 10 extending in a front-rear direction and having supply holes 11 and a discharge hole 12, through which filaments 1 pass, formed in front and rear sides thereof, a supply unit 20 provided inside the housing 10 and configured to supply the filaments 1 supplied to the supply holes 11 toward the discharge hole 12, a heating unit 30 configured to heat the filaments 1 to be discharged through the discharge hole 12, input parts 41, 42, and 43 provided on the housing 10, and a controller 50 configured to control operations of the heating unit 30 and the supply unit 20 by receiving signals from the input parts 41, 42, and 43.

In this case, a space in which the supply unit 20 and the heating unit 30 are provided is formed inside the housing 10.

In addition, the 3D pen includes a power switch 41 for turning the heating unit 30 on, a forward switch 42 for making the filament 1 protrude in front of the discharge hole 12, and a rearward switch 43 for retracting the filament 1.

According to the present invention, the supply unit 20 includes a guide block 21 that is provided to extend in a front-rear direction and has a plurality of supply passages 21*a*, through which the filaments 1 pass, formed therein, a plurality of transfer rollers 22 that are provided in the guide block 21 so as to be positioned at middle portions of the supply passages 21*a*, come into close contact with the filaments 1 passing through the supply passages 21*a*, and are rotated to transfer the supplied filaments 1 forward, a plurality of support rollers 23 that are provided at opposite sides of the supply passages 21*a* to face the transfer rollers 22, a driving motor 24 that is rotatably coupled to the guide block 21 through a rotation shaft 24*b* vertically extending and rotates to be selectively connected to the transfer roller 22 and to drive the transfer roller 22, an adjustment lever 25 that is provided outside the housing 10 and coupled to the rotation shaft 24*b*, a rotation member 26 that is connected to a portion of the adjustment lever 25 provided in the housing 10, an elastic member 27 that is connected to the adjustment lever 25 or the rotation member 26 to press the adjustment lever 25 so as to protrude outward from the housing 10, a pressure sensing part 28 that is provided in the housing 10 to detect the adjustment lever 25 when the adjustment lever 25 slides toward the housing 10, and a fixing part 29 that is coupled to the rotation member 26 to fix the rotation member 26 and the adjustment lever 25 so as to not be rotated.

Specifically, the guide block 21 includes a lower plate 21*d* and an upper plate 21*e* that are stacked onto each other, and three supply passages 21*a* are provided and formed between the lower plate 21*d* and the upper plate 21*e* so as to be laterally spaced apart from each other.

In this case, the guide block 21 has a connection passage 21*b* that is formed to extend in a front-rear direction so as to be positioned in front of the supply passages 21*a* and has a front end portion connected to the discharge hole 12. The supply passage 21a is formed such that a front end portion thereof is connected to a rear end portion of the connection passage 21b.

In addition, three supply holes 11 are formed and are connected to rear end portions of the supply passages 21a through connection tubes 15.

Therefore, after the filaments 1 having three different colors are inserted into the supply passages 21a through the supply holes 11, when one filament 1 is pushed forward, the filament 1 is discharged in front of the discharge hole 12 through the connection passage 21b.

A space 21c in which the transfer rollers 22 and support rollers 23 are rotatably coupled is formed inside the guide block 21.

The space 21c is formed such that one side thereof communicates with the supply passage 21a.

The transfer roller 22 is rotatably coupled to the support rollers 23 in the space 21c of the guide block 21 by a rotation shaft 22a vertically extending and includes gear teeth formed on a circumferential surface thereof and thus is firmly brought into close contact with one side surface of the filament 1 inserted into the supply passage 21a.

An upper end portion of the rotation shaft 22a extends upward from the guide block 21.

In this case, driven gears 22b are connected to the transfer rollers 22.

The driven gear 22b is provided as a bevel gear fixedly coupled to the upper end portion of the rotation shaft 22a so as to be positioned above the guide block 21, and when the driven gear 22b is rotated, the rotation shaft 22a and the transfer roller 22 are rotated.

The support roller 23 is rotatably coupled to the transfer roller 22 in the space 21c by a rotation shaft 23a vertically extending and supports a surface opposite to a surface of a circumferential surface of the filament 1, with which the circumferential surface of the transfer roller 22 is in close contact, thereby allowing the transfer roller 22 to be firmly brought into close contact with the circumferential surface of the filament 1.

The driving motor 24 is coupled to an upper surface of the guide block 21 so as to be laterally rotatable, and a drive gear 24a selectively coupled to the driven gear 22b is provided on a driving shaft thereof extending rearward.

The drive gear 24a is provided as a bevel gear formed to correspond to the driven gear 22b.

Therefore, as shown in FIG. 13, when the driving motor 24 is laterally rotated, the drive gear 24a is selectively coupled to one of the driven gears 22b, and thus, the driving motor 24 is selectively connected to one of the transfer rollers 22. Accordingly, the driving motor 24 may be driven to rotate the transfer roller 22 forward and reverse.

In this case, a through-hole 13 corresponding to the rotation shaft 24b provided in the driving motor 24 is formed in an upper surface of the housing 10.

The adjustment lever 25 is formed in a disk shape with a large diameter, and an extension tube 25a is provided at a central portion of a lower surface of the adjustment lever 25 and inserted into the housing 10 through the through-hole 13 to be coupled to an upper end portion of the rotation shaft 24b.

In this case, as shown in FIGS. 5 and 8, an extension part 24c with a quadrangular rod shape is formed at the upper end portion of the rotation shaft 24b, and a quadrangular coupling hole 25b, into which the extension part 24c is inserted, is formed in the extension tube 25a. Thus, the extension tube 25a is coupled to the outside of the extension part 24c so as to be slidable in a length direction of the rotation shaft 24b and to not be laterally rotatable.

The rotation member 26 extends laterally from one side of the extension tube 25a.

In this case, a plurality of concave grooves 14 are formed in an inner surface of the housing 10 around the through-hole 13, and a protrusion 26a is formed on the rotation member 26 and selectively insertion-coupled to the concave groove 14.

As shown in FIG. 8, three concave grooves 14 are formed so as to correspond to the transfer rollers 22 and are disposed to be spaced apart from each other around the through-hole 13 so as to correspond to angles of the transfer rollers 22 centered on the rotation shaft 24b.

The elastic member 27 is coupled to the outside of the rotation shaft 24b to vertically extend and is provided as a compression coil spring that has a lower end supported on an upper surface of the driving motor 24 and an upper end supported on a lower surface of the extension tube 25a and presses the adjustment lever 25 and the rotation member 26 upward.

Therefore, the adjustment lever 25 and the rotation member 26 are normally pressed upward by the elastic member 27 so that the protrusion 26a is inserted into the concave groove 14 to fix the adjustment lever 25 and the driving motor 24 so as to not be laterally rotated.

As shown in FIG. 11, when a user presses the adjustment lever 25 downward, the adjustment lever 25 and the rotation member 26 are lowered, and thus, the coupling of the protrusion 26a and the concave groove 14 is released. Accordingly, the user may rotate the adjustment lever 25 to laterally rotate the driving motor 24.

In a state in which the user rotates the driving motor 24 to connect the drive gear 24a of the driving motor 24 to the driven gear 22b provided in another transfer roller 22, when the user releases the adjustment lever 25, the adjustment lever 25 and the rotation member 26 are lifted by the elastic member 27, and thus, the protrusion 26a is inserted into and coupled to another concave groove 14. Accordingly, the driving motor 24 is fixed to not be rotated.

The pressure sensing part 28 is provided as a limit switch that is provided on the upper surface of the housing 10 so as to be positioned at a lower side of the adjustment lever 25 and detects the adjustment lever 25 when the adjustment lever 25 is lowered to output a signal.

The fixing part 29 is provided in the housing 10 to face the extension tube 25a and is operated in response to a control signal from the controller 50 to fix the adjustment lever 25 so as to not be rotated.

To this end, as shown in FIGS. 5 and 8, three fixing grooves 25c spaced apart from each other so as to correspond to angles of the concave grooves 14 are formed in a circumferential surface of the extension tube 25a, and a fixing bar 29a is provided in the fixing part 29 and selectively insertion-fixed to the fixing groove 25c.

Therefore, when the fixing bar 29a is inserted into the fixing groove 25c, the adjustment lever 25 is fixed so as to not be rotated, and when the fixing part 29 is driven by the controller 50, the fixing bar 29a is retracted and separated from the fixing groove 25c so that the adjustment lever 25 may be rotated.

In this case, the fixing groove 25c is vertically elongated and is formed such that the adjustment lever 25 and the extension tube 25a are capable of being raised and lowered in a state in which a leading end of the fixing bar 29a is coupled to the fixing groove 25c.

The controller 50 is configured to receive signals from the input parts 41, 42, and 43 and the pressure sensing part 28 and to control operations of the heating unit 30 and the supply unit 20.

The operation of the 3D pen will be described in detail as follows.

First, when the user inserts three filaments 1 having different colors into the supply holes 11 such that a leading end of the filament 1 slightly protrudes further forward than the transfer roller 22 of the supply unit 20 as shown in FIG. 3, and when the user operates the forward switch 42 in a state in which the user operates the power switch 41 to turn the heating unit 30 on, the controller 50 drives the driving motor 24 to rotate the transfer roller 22 and to push one of the three filaments 1 forward as shown in FIG. 10. Accordingly, the filament 1 is heated by the heating unit 30 and then discharged in front of the housing through the discharge hole 12.

When the user desires to manufacture an object using the filaments 1 having different colors, as shown in FIG. 11, the user presses the adjustment lever 25 downward to release the coupling of the protrusion 26a and the concave groove 14.

In this case, the controller 50 receives a signal from the pressure sensing part 28 to check the signal, and as shown in FIG. 12, the controller 50 reversely drives the driving motor 24 for a set time to retract the filament 1 inserted into the discharge hole 12 into the supply passage 21a.

In addition, the adjustment lever 25 maintains a state in which the fixing bar 29a is coupled to the fixing groove 25c and is not rotated by the fixing part 29.

When the filament 1 is retracted into the supply passage 21a, the controller 50 controls the fixing part 29 to retract the fixing bar 29a and allows the adjustment lever 25 to be rotated.

After the user rotates the adjustment lever 25 to one side to connect the drive gear 24a to the driven gear 22b connected to another transfer roller 22 as shown FIG. 13, when the user removes a finger pressing the adjustment lever 25, the adjustment lever 25 and the rotation member 26 are lifted by the elastic member 27, and accordingly, the protrusion 26a is coupled to the concave groove 14.

In this case, the controller 50 receives a signal from the pressure sensing part 28 to check the signal and controls the fixing part 29 to allow a leading end of the fixing bar 29a to be inserted into the fixing groove 25c.

When the user operates the forward switch 42, the controller 50 drives the driving motor 24 to allow the filament 1 having a different color to be transferred forward, heated by the heating unit 30, and then discharged forward through the discharge hole 12.

According to the 3D pen configured as described above, the user laterally rotates the adjustment lever 25 to allow the driving motor 24 to be connected to the different transfer rollers 22, thereby selectively moving and discharging the plurality of filaments 1 having different colors forward.

Therefore, the 3D pen has a very simple structure and has an advantage in that the filaments 1 having various colors can be easily selected to manufacture objects having various colors.

In the present embodiment, although it has been described that the guide block 21 is provided with the lower plate 21d and the upper plate 21e that are stacked onto each other, and the three supply passages 21a are provided and formed between the lower plate 21d and the upper plate 21e so as to be laterally spaced apart from each other, the shape of the guide block 21 may be variously changed.

FIGS. 14 and 15 illustrate another embodiment of the present invention, and the driven gear 22b is provided as a spur gear coupled to the rotation shaft 22a.

A rotation body 24d is coupled to the outside of the driving motor 24, and the rotation shaft 24b is provided in the rotation body 24d.

In addition, the drive gear 24a is provided as a spur gear that is rotatably coupled to the rotation body 24d and connected to the driving shaft of the driving motor 24 through a bevel gear 24e. A lever 24f extending upward through a guide hole 16 formed in the upper surface of the housing 10 is provided at the rotation body 24d.

The guide hole 16 is formed in an arc shape centered on the rotation shaft 24b, and when a user holds the lever 24f to laterally push the lever 24f, the rotation body 24d and the driving motor 24 are laterally rotated, and thus, the drive gear 24a is formed to be selectively coupled to one of a plurality of the driven gears 22b.

A push button 24g is provided at an upper end portion of the lever 24f and is pressed upward by an elastic member 24h, and the pressure sensing part 28 is provided on an upper end portion of the lever 24f. Thus, when the user pushes the button 24g downward, the controller 50 is configured to detect the push button 25g.

In addition, three fixing grooves 24i are formed in a circumferential surface of the rotation shaft 24b, the fixing part 29 is provided in the housing 10, and the driving motor 24 is laterally rotated. Thus, when the drive gear 24a is coupled to one of the plurality of driven gears 22b, the fixing bar 29a provided in the fixing part 29 is selectively coupled to the fixing groove 24i to fix the rotation shaft 24b and the driving motor 24 so as to not be laterally rotated.

Therefore, when the user presses the push button 24g downward, the controller 50 reversely drives the driving motor 24 to retract the filament 1 and then release the fixing of the fixing part 29. As a result, the user can adjust the drive gear 24a of the driving motor 24 so as to be coupled to another driven gear 22b by laterally pushing the lever 24f.

According to the 3D pen according to the present invention, the user laterally rotates the adjustment lever 25 to allow the driving motor 24 to be connected to different transfer rollers 22, thereby selectively transferring and discharging the plurality of different filaments 1 forward.

Therefore, the 3D pen has a very simple structure and has an advantage in that the filaments 1 having various colors can be easily selected to manufacture objects having various colors.

What is claimed is:

1. A three-dimensional (3D) pen comprising:
   a housing (10) extending in a front-rear direction and having supply holes (11) and a discharge hole (12), through which filament (1) pass, formed in front and rear sides thereof;
   a supply unit (20) provided inside the housing (10) and configured to supply the filaments (1) supplied to the supply holes (11) toward the discharge hole (12);
   a heating unit (30) configured to heat the filaments (1) to be discharged through the discharge hole (12);
   input parts (41, 42, 43) provided on the housing (10); and
   a controller (50) configured to control operations of the heating unit (30) and the supply unit (20) by receiving signals from the input parts (41, 42, 43),
   wherein the supply unit (20) includes:
   a guide block (21) which is provided to extend in the front-rear direction and has a plurality of supply passages (21a), through which the filaments (1) pass, formed therein;

a plurality of transfer rollers (22) which are provided in the guide block (21) so as to be positioned at middle portions of the supply passages (21a), come into close contact with the filaments (1) passing through the supply passages (21a), and are rotated to transfer the supplied filaments (1) forward and rearward; and a driving motor (24) which is provided at the guide block (21) and is selectively connected to each transfer roller (22) to drive each transfer roller (22), wherein each transfer roller (22) is rotatably coupled to the guide block (21) through a rotation shaft (22a) vertically extending, driven gears (22b) are connected to each transfer rollers (22), the driving motor (24) is coupled to the guide block (21) through a rotation shaft (24b) vertically extending so as to be laterally rotatable, and a drive gear (24a) selectively coupled to the driven gear (22b) is coupled to a driving shaft of the driving motor (24) so that, when the driving motor (24) is laterally rotated, the drive gear (24a) is selectively coupled to one of the driven gears (22b).

2. The 3D pen of claim 1, wherein the guide block (21) has a connection passage (21b) formed therein to be positioned in front of the supply passages (21a), and a front end portion of the supply passage (21a) is connected to a rear end portion of the connection passage (21b) so that the filament (1) supplied through each supply passage (21a) passes through the connection passage (21b).

3. The 3D pen of claim 1, wherein a through-hole (13) concentric with the rotation shaft (24b) is formed in the housing (10), and the 3D pen further includes an adjustment lever (25) provided outside the housing (10) and coupled to the rotation shaft (24b) through the through-hole (13) so as to be slidable in a length direction of the rotation shaft (24b) and to not be laterally rotated, a rotation member (26) connected to a portion of the adjustment lever (25) provided inside the housing (10), an elastic member (27) connected to the adjustment lever (25) or the rotation member (26) to press the adjustment lever (25) so as to protrude outward from the housing (10), a pressure sensing part (28) provided in the housing (10) to detect the adjustment lever (25) when the adjustment lever (25) slides toward the housing (10), and a fixing part (29) coupled to the rotation member (26) and configured to fix the rotation member (26) and the adjustment lever (25) so as to not be rotated, wherein a plurality of concave grooves (14) are formed in an inner surface of the housing (10) around the through-hole (13), a protrusion (26a) is formed on the rotation member (26) and selectively inserted into the concave groove (14), and fixing grooves (25c) to which the fixing part (29) is selectively coupled are formed in a circumferential surface of the rotation member (26) so that, when a user presses the adjustment lever (25) to slide the adjustment lever (25) and the rotation member (26) into the housing (10), the controller (50) reversely drives the driving motor (24) to retract the filament (1) by a predetermined distance and then controls the fixing part (29) to release the fixing of the rotation member (26) and to allow the user to rotate the adjustment lever (25).

4. The 3D pen of claim 1, wherein a rotation body (24d) is coupled to an outside of the driving motor (24), the rotation shaft (24b) is provided in the rotation body (24d), a lever (24f), which extends upward through a guide hole (16) formed in an upper surface of the housing (10), is provided at the rotation body (24d), a push button (24g), which is pressed upward by an elastic member (24h), is provided at an upper end portion of the lever (24f), and the 3D pen further includes a pressure sensing part (28) provided on the upper end portion of the lever (24f) to detect the push button (24g) when a user presses the push button (24g) downward, and a fixing part (29) coupled to the rotation shaft (24b) to fix the rotation shaft (24b) and the drive motor (24) so as to not be rotated, wherein, when the user presses the push button (24g) downward, the controller (50) receives a signal from the pressure sensing part (28) to detect the signal, reversely drives the driving motor (24) to retract the filament (1) by a predetermined distance, and then controls the fixing part (29) to release the fixing of the rotation shaft (24b) and the drive motor (24) and to allow the user to laterally push the lever (24F) and to laterally rotate the driving motor (24).

\* \* \* \* \*